(12) United States Patent
Rehhoff et al.

(10) Patent No.: US 10,989,326 B2
(45) Date of Patent: Apr. 27, 2021

(54) CONTROL OF SUPPLY OF AIR TO A PNEUMATIC VALVE ACTUATOR

(71) Applicant: ALFA LAVAL CORPORATE AB, Lund (SE)

(72) Inventors: Kenneth Rehhoff, Odense C (DK); Jens Folkmar Andersen, Fredericia (DK)

(73) Assignee: ALFA LAVAL CORPORATE AB, Lund (SE)

( * ) Notice: Subject to any disclaimer, the term of this patent is extended or adjusted under 35 U.S.C. 154(b) by 95 days.

(21) Appl. No.: 16/097,362

(22) PCT Filed: May 22, 2017

(86) PCT No.: PCT/EP2017/062233
§ 371 (c)(1),
(2) Date: Oct. 29, 2018

(87) PCT Pub. No.: WO2017/207315
PCT Pub. Date: Dec. 7, 2017

(65) Prior Publication Data
US 2019/0145542 A1   May 16, 2019

(30) Foreign Application Priority Data

Jun. 3, 2016 (EP) .................................. 16172786

(51) Int. Cl.
*F16K 31/122* (2006.01)
*F16K 31/124* (2006.01)
*F15B 11/06* (2006.01)

(52) U.S. Cl.
CPC .......... *F16K 31/1221* (2013.01); *F15B 11/06* (2013.01); *F16K 31/124* (2013.01);
(Continued)

(58) Field of Classification Search
CPC .... F15B 2211/3058; F15B 2211/50518; F15B 2211/5153; F15B 2211/655;
(Continued)

(56) References Cited

U.S. PATENT DOCUMENTS

| 89,023 | A | * | 4/1869 | Bulkley et al. | ....... F16K 15/144 137/858 |
| 2,310,100 | A | * | 2/1943 | Losey | ..................... F15B 11/02 91/420 |

(Continued)

FOREIGN PATENT DOCUMENTS

| CN | 102149925 A | 8/2011 |
| CN | 202327323 U | 7/2012 |

(Continued)

OTHER PUBLICATIONS

An English Translation of the Office Action dated Jul. 29, 2019 by the China National Intellectual Property Administration in corresponding Chinese Patent Application No. 201780034106.5. (5 pages).

(Continued)

*Primary Examiner* — Kevin F Murphy
*Assistant Examiner* — Jonathan J Waddy
(74) *Attorney, Agent, or Firm* — Buchanan Ingersoll & Rooney PC (57) ABSTRACT

A technology is disclosed for controlling the function of a pneumatic valve actuator. The piston of the valve actuator is biased to be in first state and move to a second state when pressurized. A conduit connects the pressure side and non-pressure sides of the valve actuator for supplying the non-pressure side of the valve actuator with gas from the pressure side of the valve actuator. A control valve is connected to the conduit for controlling a release of gas from the pressure side of the valve actuator. The valve controller also has pressure-relief valve connected to the conduit between the (Continued)

control valve and the non-pressure side of the valve actuator for reducing the pressure in the conduit.

18 Claims, 3 Drawing Sheets

(52) U.S. Cl.
CPC .............. *F15B 2211/3058* (2013.01); *F15B 2211/50518* (2013.01); *F15B 2211/5153* (2013.01); *F15B 2211/655* (2013.01); *F15B 2211/7052* (2013.01); *F15B 2211/8855* (2013.01)

(58) Field of Classification Search
CPC ...... F15B 2211/7052; F15B 2211/8855; F15B 11/06; F16K 15/144; F16K 31/1221; F16K 31/124; F16K 31/1245
USPC .............................................. 251/30.01, 63.6
See application file for complete search history.

(56) References Cited

U.S. PATENT DOCUMENTS

| | | | |
|---|---|---|---|
| 2,510,649 A | 6/1950 | Neff | |
| 3,456,561 A | 7/1969 | Laikam | |
| 3,795,255 A * | 3/1974 | Malott | F15B 11/02 137/102 |
| 5,662,723 A | 9/1997 | Dickens | |
| 6,805,163 B2 | 10/2004 | Lee | |
| 7,434,780 B2 * | 10/2008 | Hayashi | F16K 31/1221 251/12 |
| 7,698,991 B2 | 4/2010 | Sato et al. | |
| 8,070,844 B2 | 12/2011 | Maguire | |
| 8,714,318 B2 | 5/2014 | Darner et al. | |
| 9,212,671 B2 * | 12/2015 | Karte | F16K 31/124 |
| 9,352,759 B2 | 5/2016 | Ogawa | |
| 2008/0000733 A1 | 1/2008 | Ehrlich | |
| 2011/0248195 A1 * | 10/2011 | Fry | B61D 7/28 251/28 |
| 2013/0186080 A1 * | 7/2013 | Hata | F15B 15/204 60/371 |
| 2014/0116241 A1 * | 5/2014 | Valentin-Rumpel | F15B 21/08 91/361 |
| 2014/0361202 A1 * | 12/2014 | Maljanian | G05D 7/0153 251/30.01 |
| 2016/0039532 A1 | 2/2016 | Larson, Jr. et al. | |
| 2016/0098045 A1 * | 4/2016 | Ito | F15B 13/027 137/488 |

FOREIGN PATENT DOCUMENTS

| | | |
|---|---|---|
| DE | 29 04 805 A1 | 8/1980 |
| JP | 2005282712 A | 10/2005 |

OTHER PUBLICATIONS

International Search Report (PCT/ISA/210) dated Jul. 20, 2017, by the European Patent Office as the International Searching Authority for International Application No. PCT/EP2017/062233.
Written Opinion (PCT/ISA/237) dated Jul. 20, 2017, by the European Patent Office as the International Searching Authority for International Application No. PCT/EP2017/062233.

* cited by examiner

CONTROL OF SUPPLY OF AIR TO A PNEUMATIC VALVE ACTUATOR

TECHNICAL FIELD

The invention relates to the control of pneumatic valve actuators that are biased to be in a de-energized state. In particular, it relates to a control of the supply and discharge of gas of the pressure and non-pressure sides of such a valve actuator.

BACKGROUND ART

Automated valve systems are commonly used today in great variety of applications. In many of these, the valve is controlled by a pneumatically operated valve actuator having a cylinder and a piston that moves inside the cylinder, wherein the piston is biased to be in a de-energized or resting state. Typically, this is achieved by mechanical means, for example by a coil spring located inside the cylinder and acting on the piston. Compressed air enters the pressure side of the actuator and moves the piston to an energized or activated state. At the same time, air on the non-pressure side of the actuator escapes from the cylinder to prevent pressure from building up on the non-pressure side. When the pressure is released on the pressure side, the compressed air escapes and the piston moves from the energized state to the de-energized state. At the same time, air enters the non-pressure side.

In the described actuators, the piston typically has a gasket preventing pressurized gas from leaking from the pressure side to the non-pressure side inside the cylinder. Air enters the non-pressure side from the surrounding atmosphere. However, the air typically contains particles and dust that also enters the non-pressure side and that accumulate inside the cylinder, which results in wear on the gasket that reduces the service lifetime of the valve actuator. This is considered being one of the more common reasons for gasket failure.

Many existing valves and actuators are installed in tight spaces with little room for retrofitting, such as additional tubing or extra components. Thus, there is a need for a solution located close the valve actuators and that requires as little space as possible.

SUMMARY

It is an object of the invention to at least partly overcome one or more of the above-identified limitations of known techniques. In particular, it is an object to prevent air of the surrounding atmosphere from entering the non-pressure side of a valve actuator. It also an object to provide a solution at the valve actuator that requires little or no additional space, and that can be installed in close proximity to the valve actuator. It is also an object to provide a solution that is suitable for retrofitting.

To meet the above objects, an assembly comprising a valve actuator and an actuator controller for controlling the function of the valve actuator is provided. The valve actuator is pneumatically operated, configured for being operatively connected to a valve, and comprises a cylinder and a piston movable inside the cylinder. The valve actuator has a pressure side and a non-pressure side separated by the piston, and the piston is biased to be in a first position and is configured to move to a second position at a pressure increase on the pressure side of the valve actuator.

The actuator controller comprises a conduit connecting the pressure and non-pressure sides of the valve actuator for supplying the non-pressure side of the valve actuator with gas from the pressure side of the valve actuator. The actuator controller also comprises a control valve connected to the conduit between the pressure and non-pressure sides for controlling a release of gas from the pressure side of the valve actuator into the conduit. Additionally, the actuator controller also comprises a pressure-relief valve connected to the conduit between the control valve and the non-pressure-side of the valve actuator for reducing the pressure in the conduit.

The conduit has the effect that clean air from the pressure side of the actuator enters the non-pressure side when the piston moves from the second position to the first position. Typically, the displaced volume of gas is the same on the pressure side and the non-pressure side when the piston moves between the two states, but with an increase on one side and a decrease on the other side. The pressure is higher on the pressure side, which means that no additional source of gas, such as the surrounding atmosphere, is necessary for filling the non-pressure side when the piston moves from the second position to the first position. Thus, particles and dust from the surrounding atmosphere, or any other source of gas, are prevented from entering the cylinder of the valve actuator.

The pressure-relief valve reduces the pressure in the conduit so that the non-pressure side can have a lower pressure. This way, the conduit will have little or no effect on the function of the valve actuator, which means that the valve actuator can be constructed without taking the conduit into account. Thus, the actuator controller is suitable for a retrofitting, as described below.

The actuator controller may be located at the valve actuator. This is possible since the conduit is required only to stretch from the pressure side to the non-pressure side and a pressure relief valve can be made small. Thus, no centralized control or extended piping system is required. The conduit may have a length of the same order of magnitude as the length of cylinder of the valve actuator. For example, the length of the conduit may be less than two times the length of the cylinder, four times the length of the cylinder, six times the length of the cylinder, or eight times the length of the cylinder. Thus, the space required by the conduit is limited.

The control valve may comprise: an inlet for being connected to and receive a pressurized gas from a pressure source, a combined inlet and outlet, and an outlet. The control valve further has a first state in which it can lead pressurized gas from the inlet to the combined inlet and outlet and a second state in which it can lead pressurized gas from the combined inlet and outlet to the outlet. The conduit may further comprise: a first conduit section connecting the combined inlet and outlet of the control valve to the pressure side of the valve actuator, and a second conduit section connecting the outlet of the control valve and to the non-pressure side of the valve actuator, wherein the pressure-relief valve forms part of the second conduit section. This means that the supplying of gas from the pressure side to the non-pressure side can be controlled by the same control valve that controls the function of the valve actuator. Thus, no additional control valve is required, which would have required space at the valve actuator.

The valve actuator may further comprise: a first combined inlet and outlet for allowing gas to enter and escape the pressure side of the valve actuator, wherein the first combined inlet and outlet is connected to the first conduit section. It may also further comprise: a second combined inlet and outlet for allowing gas to enter and escape the non-pressure side of the valve actuator, wherein the second combined inlet and outlet is connected to the second conduit section. For valve actuators of the specified type, the proposed first and second conduit sections minimizes the number of conduit parts required for supplying gas from the pressure side to the non-pressure side, thus also minimizing the required space.

The above objects are also met by an actuator controller for controlling the function of a valve actuator. The valve actuator is pneumatically operated, configured for being operatively connected to a valve, and comprises a cylinder and a piston movable inside the cylinder. The valve actuator further has a pressure side and a non-pressure side separated by the piston, and the piston is biased to be in a first position and is configured to move to a second position at a pressure increase on the pressure side of the valve actuator.

The actuator controller comprises: a conduit configured for connecting the pressure and non-pressure sides of the valve actuator for supplying the non-pressure side of the valve actuator with gas from the pressure side of the valve actuator. The actuator further comprises: a control valve connected to the conduit between the pressure and non-pressure sides for controlling a release of gas from the pressure side of the valve actuator into the conduit. Additionally, the actuator controller comprises: a pressure-relief valve connected to the conduit between the control valve and the non-pressure-side of the valve actuator and configured for reducing the pressure in the conduit.

The described features of the actuator controller have the same effects as the corresponding features described above in relation to the assembly.

The control valve of the actuator controller may comprise: an inlet for being connected to and receive a pressurized gas from a pressure source, a combined inlet and outlet, and an outlet. The control valve further has a first state in which it can lead pressurized gas from the inlet to the combined inlet and outlet and a second state in which it can lead pressurized gas from the combined inlet and outlet to the outlet. Additionally, the conduit may comprise: a first conduit section configured for connecting the combined inlet and outlet of the control valve to the pressure side of the actuator, and a second conduit section configured for connecting the outlet of the control valve and to the non-pressure side of the valve actuator, wherein the pressure-relief valve forms part of the second conduit section. Thus, no additional control valve is required for supplying gas from the pressure side to the none-pressure side, as described above, and the actuator controller can be made smaller.

The valve actuator may further comprise: a first combined inlet and outlet for allowing gas to enter and escape the pressure side of the valve actuator, and the first conduit section may be configured for being connected to the first combined inlet and outlet. Additionally, the valve actuator may further comprises: a second combined inlet and outlet for allowing gas to enter and escape the non-pressure side of the valve actuator, and the second conduit section may be configured for being connected to the second combined inlet and outlet. As described above, this contributes to minimizing the required space for the supply of gas from the pressure side to the non-pressure side of the valve actuator.

To meet the above objects, a valve system is also provided comprising a valve and the assembly described above operatively connected to the valve.

The above objects are also met by a method of retrofitting a pressure-relief valve in an assembly comprising a valve actuator and an actuator controller for controlling the function of the valve actuator. The valve actuator is pneumatically operated, configured for being operatively connected to a valve, and comprises a cylinder and a piston movable inside the cylinder. The valve actuator further has a pressure side and a non-pressure side separated by the piston, and the piston is biased to be in a first position and is configured to move to a second position at a pressure increase on the pressure side of the valve actuator.

The actuator controller comprises a control valve for controlling a release of gas from the pressure side of the valve actuator, wherein the control valve comprises an inlet for being connected to and receive a pressurized gas from a pressure source, a combined inlet and outlet, and an outlet. The control valve has a first state in which it can lead pressurized gas from the inlet to the combined inlet and outlet and a second state in which it can lead pressurized gas from the combined inlet and outlet to the outlet. The assembly further comprises a first conduit section connecting the combined inlet and outlet of the control valve to the pressure side of the actuator.

The method comprises: providing second conduit section and a pressure-relief valve forming part of the second conduit section, and establishing a connection between the outlet of the control valve and the non-pressure side of the valve actuator with the second conduit section. The first conduit section, the control valve, the second conduit section, and the pressure-relief valve form parts of a conduit connecting the pressure and non-pressure sides of the valve actuator for supplying the non-pressure side of the valve actuator with gas from the pressure side of the valve actuator. The pressure-relief valve is further configured for reducing the pressure in the second conduit section. The pressure-relief valve may form a part of the second conduit section.

The described method results in a pressure-relief valve being connected to the conduit between the control valve and the non-pressure-side of the valve actuator. The method also results in the control valve being connected to the conduit between the pressure and non-pressure sides of the valve actuator, thereby allowing for a controlling of a release of gas from the pressure side of the valve actuator into the conduit. Thus, the described method of retrofitting a pressure relief valve results in an actuator controller as described above prior to the method.

The valve actuator in the described method may comprise a first combined inlet and outlet for allowing gas to enter and escape the pressure side of the valve actuator and a second combined inlet and outlet for allowing gas to enter and escape the non-pressure side of the valve actuator. The first combined inlet and outlet may be connected to the first conduit section, and the method may further comprise: establishing a connection between the outlet of the control valve and the second combined inlet and outlet with the second conduit section. This contributes to minimizing the required space for the supply of gas from the pressure side to the non-pressure side of the valve actuator, as described above.

In the different aspects of the proposed technology above, i.e. the described assembly, actuator controller, valve system, and method of retrofitting, the pressure-relief valve may be a non-return valve configured to prevent air from the surrounding atmosphere from entering the conduit. In the event pressure equilibrium is reached between the pressure side and the non-pressure side before the piston reaches the first position when moving from the second position, the non-return valve prevents air from the surrounding atmosphere, thus also dust and particles, from entering the conduit and the cylinder of the valve actuator.

The pressure-relief valve may further be configured to reduce the pressure in the conduit to a pressure level at the pressure level of the surrounding atmosphere. This way, the pressure on the non-pressure side will not raise significantly above the ambient pressure, either when supplied with air from the pressure side, or when the piston moves from the first state to the second state and the volume on the non-pressure side is reduced. This means that the conduit will not influence the function of a valve actuator originally constructed for receiving air from the surrounding atmosphere from the surroundings on the non-pressure side, or for that matter constructed for expelling gas from the non-pressure side to the surrounding atmosphere. Thus, the described pressure relief valve is suitable for a retrofitting on this kind of valve actuators In the different aspects of the proposed technology, the pressure-relief valve may comprise an aperture for allowing gas to be released from the conduit to the surrounding atmosphere and a flexible membrane covering and pressing against the aperture for preventing air from the surrounding atmosphere from entering the conduit. This pressure-relief valve has the advantage that they require little space.

The piston may be mechanically biased to be in a first position. Further, the valve actuator may comprise a coil spring located inside the actuator and on the non-pressure side of the actuator, wherein the coil spring engages the piston for biasing the piston in the first position. The piston may comprise a slidable gasket for preventing pressurized air on the pressure side to leak into the non-pressure side inside the cylinder. This is different from linear membrane actuators that do not rely on piston moving inside a cylinder. In the different aspects described above, the control valve may constitute a part of the conduit. Similarly, the pressure-relief valve may constitute a part of the conduit.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1A:
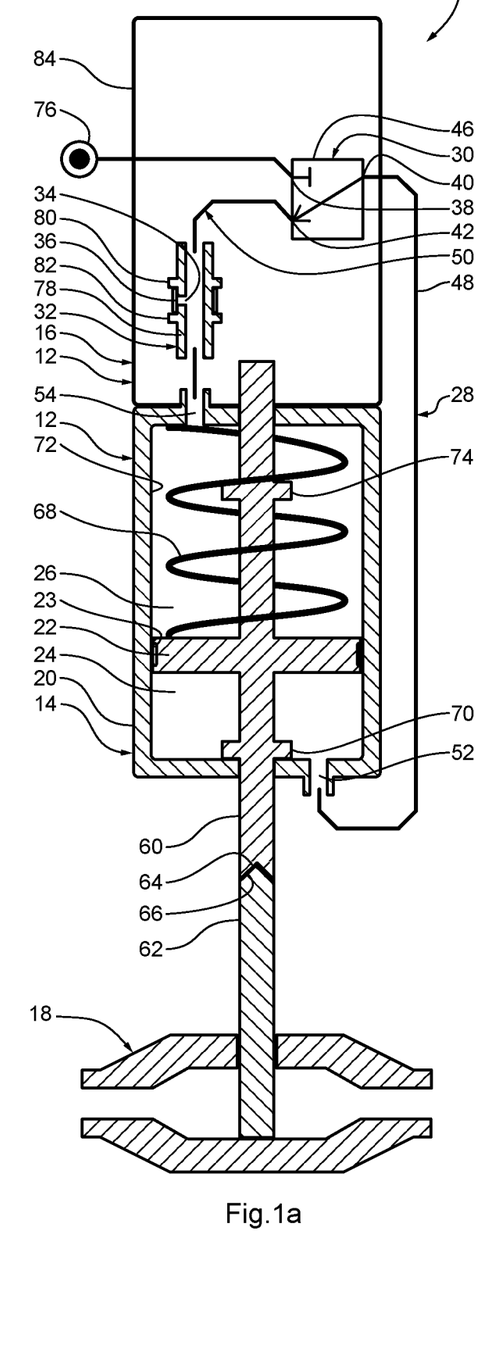
FIG. 1a is a schematic cross-sectional view of a valve system having a valve actuator in a first position corresponding to a de-energized state.
Figure 1B:
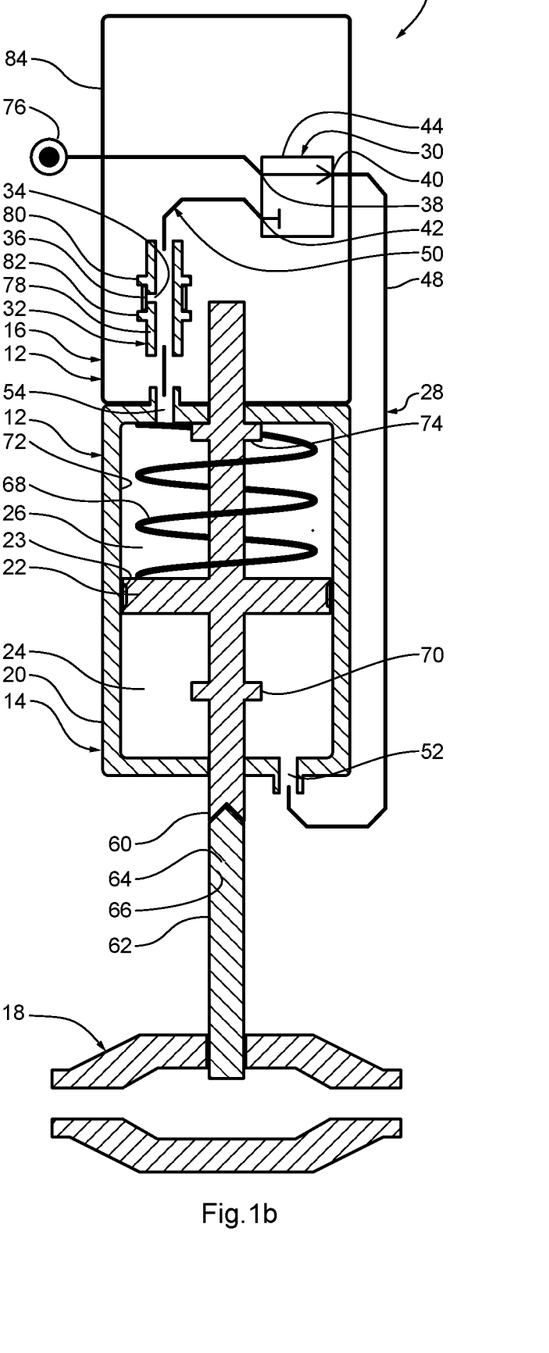
FIG. 1b is schematic cross-sectional view of the valve system shown in FIG. 1a, but with the valve actuator in a second position corresponding to an energized state.

A schematic view of a valve system 10 is shown in FIGS. 1a and 1b. The valve system 10 has valve 18 and an assembly 12 composed of a valve actuator 14 and an actuator controller 16. The valve actuator 14 has a cylinder 20 and a piston 22 separating the valve actuator 14 into a pressure side 24 and a non-pressure side 26. The piston has a slidable gasket 23 engaging the wall 72 of the cylinder 20 and that prevents pressurized gas from leaking from the pressure side 24 to the non-pressure side 26 inside the cylinder 20.

The piston 22 has a piston rod 60 connected to a valve stem 62 of the valve 18, and when the piston moves the stem opens and closes the valve 18, as shown in FIGS. 1a and 1b. The piston rod 60 has a threaded bore 64 and the valve stem 62 has a cooperating threaded end 66 that is screwed into the threaded bore 64, thereby operatively connecting the piston 22 to the valve 18.

A coil spring 68 is located inside the cylinder on the non-pressure side 26 and acting on the wall 72 of the cylinder 20 and on the piston 22, as illustrated in FIG. 1a showing the valve actuator 14 in the de-energized state. The piston rod 60 has a lower disc 70 inside the cylinder 20 that rests on the wall 72 of the cylinder 20 and prevents the piston 22 from moving further. Thus, the piston 22 is biased to be in a first position. The piston rod 60 also has an upper disc 74 inside the cylinder. When the pressure is increased on the pressure side 24 of the actuator 14 and the force of the coil spring 68 acting on the piston 22 is surpassed, the piston 22 moves from the first position until the upper disc 74 reaches the wall 72 of the cylinder 20, thus preventing any further movement of the piston 22. Thus, the valve actuator 14 is energized and the piston 22 has moved and reached a second position. At the same time, the piston rod 60 has pulled the valve stem 62 and opened the valve 18.

The valve actuator 14 has a first combined inlet and outlet 52 that allows gas to enter and escape the cylinder 20 on the pressure side 24 of the valve actuator 14. Similarly, the valve actuator 14 has a second combined inlet and outlet 54 that allows gas to enter and escape the cylinder 20 on the non-pressure side 26 of the valve actuator 14.

The actuator controller 16 has a control valve 30 in the form of a solenoid valve that controls the function of the valve actuator 14. The control valve 30 has an inlet 38 connected to an external source 76 of compressed air not forming part of the valve system 10. The control valve 30 further has a combined inlet and outlet 40 that is connected to the first combined inlet and outlet 52 of the valve actuator 14 by a first conduit section 48, thus also connecting the combined inlet and outlet 40 to the pressure side 24 of the valve actuator 14. The control valve 30 also has an outlet 42 that is connected to the second combined inlet and outlet 54 of the valve actuator 14 by a second conduit section 50, thereby connecting the outlet 42 to the non-pressure side 26 of the valve actuator 14.

The control valve 30 has a first state 44, which is schematically illustrated in FIG. 1b, and a second state, which is schematically illustrated in FIG. 1a. In the first state, the control valve 30 leads compressed air from the inlet 38 to the combined inlet and outlet 40, thus increasing the pressure on the pressure side 24 of the actuator 14, which causes the piston 22 to move from the first position illustrated in FIG. 1a to its second position illustrated in FIG. 1b. When switched to its second state 46, the control valve leads the compressed air on the pressure side 24 from its combined inlet and outlet 40 to its outlet 42. The pressure on the pressure side 24 of the actuator then decreases, thus causing the piston 22 to move from the second position illustrated in FIG. 1b to its first position illustrated in FIG. 1a.

A pressure-relief valve 32 is located between the control valve 30 and the non-pressure-side 26 side of the valve actuator 14 and constitutes a part of the second conduit section 50, as shown in FIGS. 1a and 1b. The pressure-relief valve 32 has an aperture 34 that releases some of the compressed air from the control valve 30 to the surrounding atmosphere, thus reducing the pressure in the second conduit section 50. Additionally, when the piston 22 moves from the first position shown in FIG. 1a to the second position shown in FIG. 1b, the gas on the non-pressure side 26 is vented through the aperture 34 of the pressure-relief valve 32.

The pressure-relief valve 32 has a circular symmetric cylindrical hollow body 78 with two outward facing annular ridges 80 and 82 on either side of the aperture 34. An annular flexible membrane 36 in the form of a ring-shaped rubber band is positioned between and held in place by the ridges 80 and 82. The flexible membrane 36 has a circumference that is slightly smaller than the circumference of the body 78, thus covering and pressing against the aperture 34 so that air from the surrounding atmosphere is prevented from entering the second conduit section 50. This means that the pressure-relief valve 32 has the function of non-return valve. The flexible membrane 36 has a flexibility that allows for the pressure inside the second conduit section 50 to reach the pressure of the surrounding atmosphere, or a slightly higher pressure.

The first conduit section 48, the control valve 30, the second conduit section 50, and the pressure-relief valve 32 form parts of a conduit 28 that connects the pressure side 24 and non-pressure side 26 of the valve actuator 14 that supplies the non-pressure side 26 of the valve actuator with air from the pressure side 24 of the valve actuator 14. The conduit 28 has the effect that the non-pressure side 26 of the valve actuator 14 will be supplied with non-compressed air from the external source of compressed air 76 via the pressure side 24 of the valve actuator 14. Thus no dust or particles of the surrounding atmosphere will enter the cylinder 20 of the valve actuator 14. Thus, wear on the gasket 23 is reduced and the service lifetime of the valve actuator 14 is increased. It should be noted that air is typically filtered when compressed in compressor and no dust or particles from the surrounding atmosphere will enter the valve actuator 14 via such a source.

Figure 2A:
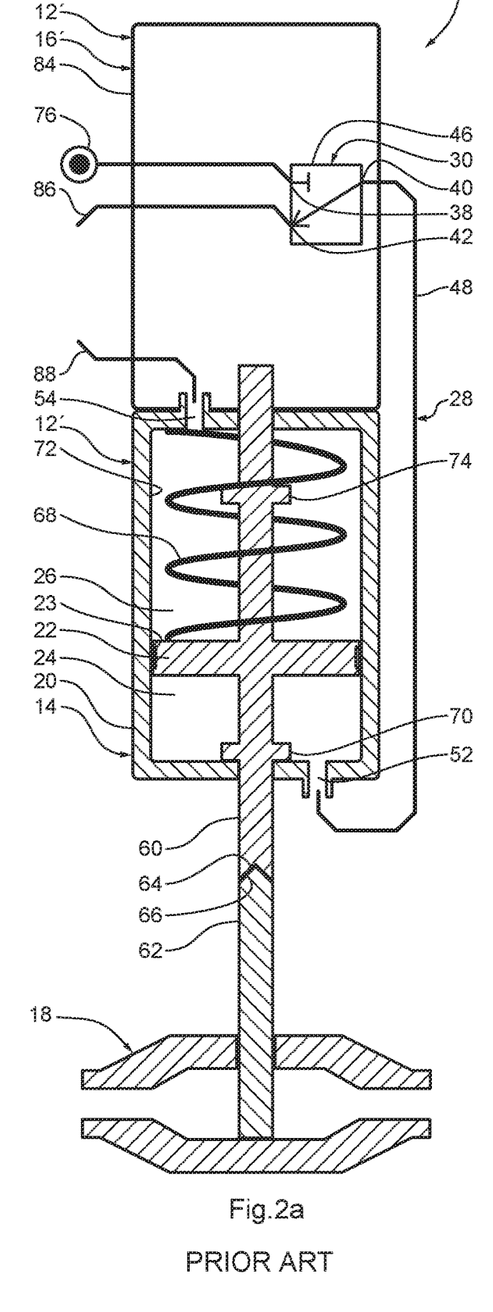
FIG. 2a is a schematic cross-sectional view of a valve system without a pressure-relief valve and having a valve actuator in a first position corresponding to a de-energized state.
Figure 2B:
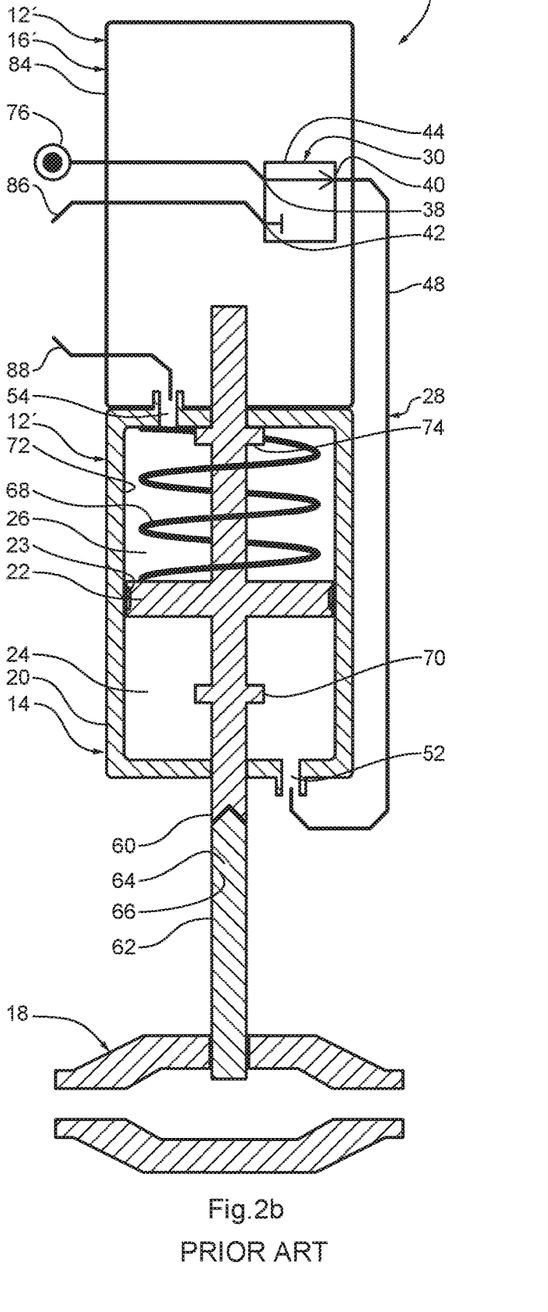
FIG. 2b is schematic cross-sectional view of the valve system shown in FIG. 2a, but with the valve actuator, and being in a second position corresponding to an energized state.

A valve system 10' is shown in FIGS. 2a and 2b that is assumed to be existing. Features having the same function as in the previously described embodiment have been given the same number indexing. Features having similar or related function have also been given the same number indexing, but with a prime.

The actuator controller 16' has a housing 84 that is attached to the valve actuator 14 and in which the control valve 30 is situated. The housing 84 is ventilated so that air in the surrounding atmosphere can enter and escape the housing 84.

The valve system 10" differs from the previous embodiment in that the actuator controller 16' has no second conduit section with a pressure relief valve that connects the outlet 42 of the control valve 30 to the second combined inlet and outlet of the valve actuator 54. Instead, an outlet conduit 86 is coupled to the control valve 30. The outlet conduit 86 is connected at one end to the outlet 42 of the control valve 30. Its other end is outside the housing 84 of the actuator controller 16' and opens to the surrounding atmosphere. Thus, when the control valve is in its second state 46, as shown in FIG. 2a, compressed air on the pressure side 24 of the valve actuator 14 is vented via the first conduit section 48, the control valve 30, and the outlet conduit 86 into the surrounding atmosphere.

A combined inlet and outlet conduit 88 is coupled to the valve actuator 14. At one end it is connected to the second combined inlet and outlet 54 of valve actuator 14. Its other end is outside the housing 84 of the actuator controller 16' and opens to the surrounding atmosphere. Thus, when the piston 22 moves from the first position shown in FIG. 2a to the second position shown in FIG. 2b, the gas on the non-pressure side 26 is vented through combined inlet and outlet conduit 88 into the surrounding atmosphere. When the piston 22 moves from the second position shown in FIG. 2b to the first position shown in FIG. 2a, air from the surrounding atmosphere is sucked into the cylinder 20 on the non-pressure side 26 via the combined inlet and outlet conduit 88, resulting in long term accumulation of dust and particles inside of the cylinder 20 that causes wear on the gasket 23.

Figure 3A:
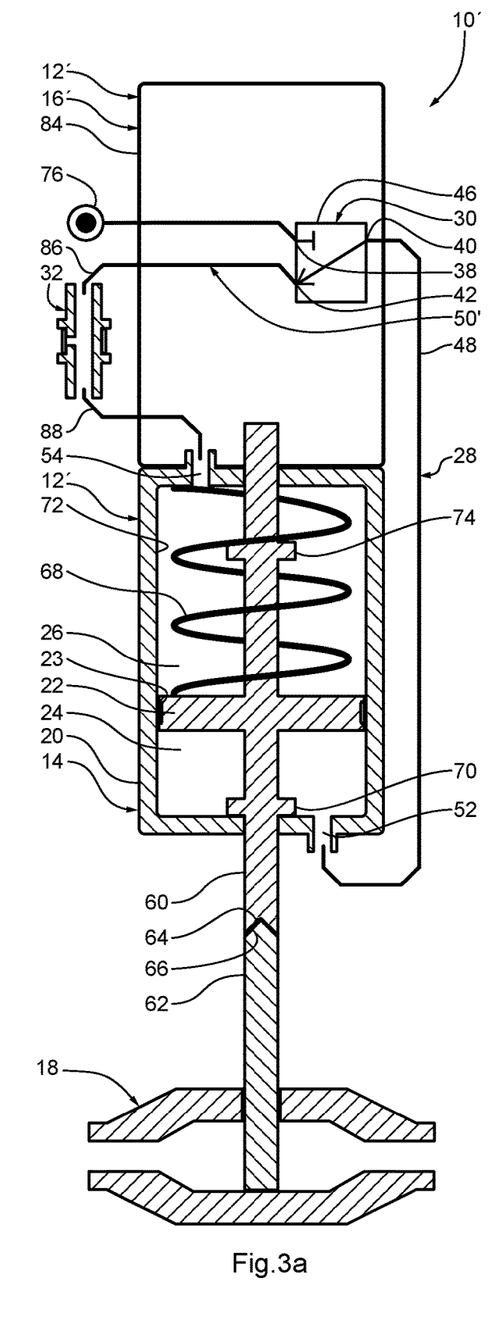
FIG. 3a is a schematic cross-sectional view of the valve system shown in FIG. 2a with a retrofitted pressure-relief valve and having a valve actuator in a first position corresponding to a de-energized state.
Figure 3B:
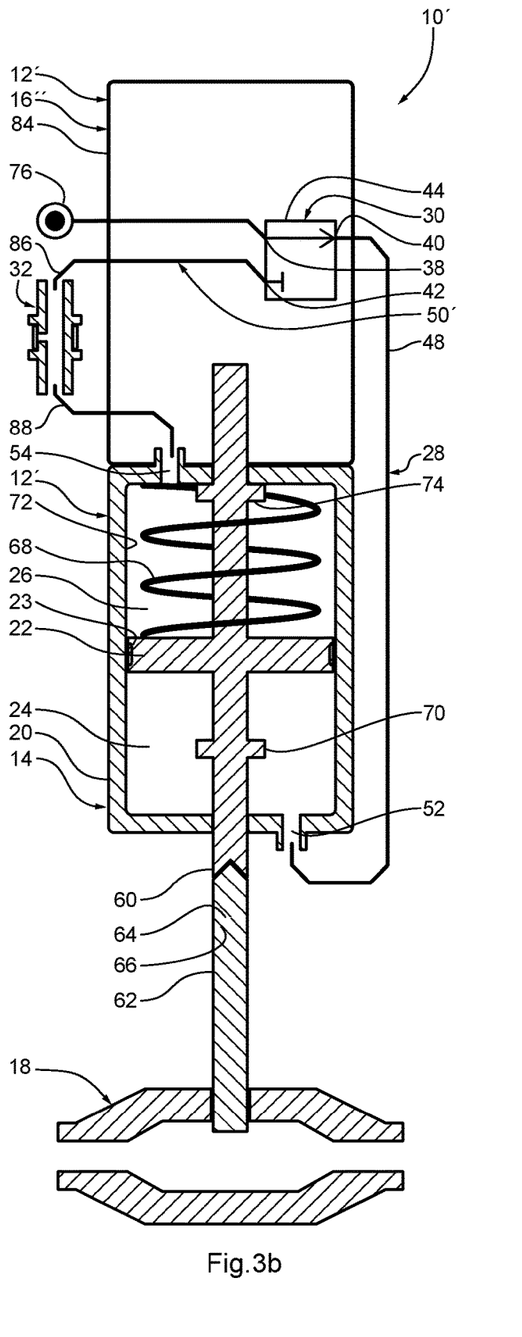
FIG. 3b is schematic cross-sectional view of the valve system shown in FIG. 3a, but with the valve actuator in a second position corresponding to an energized state.

Another embodiment of a valve system 10' is shown in FIGS. 3a and 3b. The valve system has all the features of the valve system 10" described above in relation in FIGS. 2a and 2b. Features having the same function as in the embodiment described in relation to FIGS. 1a and 1b have been given the same number indexing, while features having similar or related function have been given the same number indexing, but with a prime.

A pressure-relief valve 32 has been connected to the outlet conduit 86 and the combined inlet and outlet conduit 88 on the outside of the housing 84 of actuator controller 16, thus constituting a retrofitting of the pressure-relief valve 32 to the valve system 10', as shown in FIGS. 3a and 3b. The outlet conduit 86, the pressure-relief valve 32, and the combined inlet and outlet conduit 88 forms a conduit section 50'. The retrofitting thus results in a valve system 10' having all the functions of the valve system 10 described in relation to FIGS. 1a and 1b. Effectively, a second conduit section 50' with a pressure-relief valve 32 has been provided. Also, a connection between the outlet 42 of the control valve 30 and the second combined inlet and outlet 54 on the non-pressure side 26 of the valve actuator 14 has been established with the second conduit section 50'.

From the description above follows that, although various embodiments of the invention have been described and shown, the invention is not restricted thereto, but may also be embodied in other ways within the scope of the subject-matter defined in the following claims.

ITEM LIST 10 valve system
12 assembly
14 valve actuator
16 actuator controller
18 valve
20 cylinder
22 piston
23 gasket
24 pressure side
26 non-pressure side
28 conduit
30 control valve
32 pressure-relief valve
34 aperture
36 flexible membrane
38 inlet of control valve
40 combined inlet and outlet of control valve 42 outlet of control valve
44 first state
46 second state
48 first conduit section
50 second conduit section
52 first combined inlet and outlet of valve actuator
54 second combined inlet and outlet of valve actuator
60 piston rod
62 valve stem
64 threaded bore
66 threaded end
68 coil spring
70 lower disc
72 cylinder wall
74 upper disc
76 external source of compressed air
78 body of pressure-relief valve
80 ridge
82 ridge
84 housing of actuator controller
86 outlet conduit
88 combined inlet and outlet conduit

The invention claimed is:

1. An actuator controller for controlling the function of a valve actuator, wherein the valve actuator is pneumatically operated, configured for being operatively connected to a valve, and comprises a cylinder and a piston movable inside the cylinder, the valve actuator has a pressure side and a non-pressure side separated by the piston, the piston is biased to be in a first position and is configured to move to a second position at a pressure increase on the pressure side of the valve actuator, and wherein the actuator controller comprises:
a conduit configured for being connected to the pressure and non-pressure sides of the valve actuator for supplying the non-pressure side of the valve actuator with gas from the pressure side of the valve actuator,
a control valve connected to the conduit between the pressure and non-pressure sides for controlling a release of gas from the pressure side of the valve actuator into the conduit, and
a pressure-relief valve connected to the conduit to reduce the pressure in the conduit, the pressure-relief valve being positioned relative to the control valve such that when the conduit is connected to the pressure and non-pressure sides of the valve actuator the pressure-relief valve is between the control valve and the non-pressure side of the valve actuator so that gas supplied from the pressure side of the valve actuator to the non-pressure side of the valve actuator flows from the pressure side of the valve actuator through the control valve and subsequently passes through the pressure-relief valve which directs the gas to the non-pressure side of the valve actuator.

2. The actuator controller according to claim 1, wherein the control valve comprises:
an inlet configured for being connected to a pressure source to receive a pressurized gas from the pressure source,
a combined inlet and outlet, and
an outlet,
wherein the control valve is configured to be operable between: i) a first state in which the control valve permits flow of the pressurized gas from the pressure source to the pressure side of the valve actuator by allowing the pressurized gas to flow from the inlet to the combined inlet and outlet, and prevents the flow of the pressurized gas from the pressure side of the valve actuator to the non-pressure side of the valve actuator by blocking the flow of the pressurized gas from the combined inlet and outlet to the outlet; and ii) a second state in which the control valve permits the flow of the pressurized gas from the pressure side of the valve actuator to the non-pressure side of the valve actuator by allowing the pressurized gas to flow from the combined inlet and outlet to the outlet, and prevents the flow of the pressurized gas from the pressure source to the pressure side of the valve actuator by blocking the flow from the inlet to the combined inlet and outlet, and wherein the conduit comprises:
a first conduit section configured for connecting the combined inlet and outlet of the control valve to the pressure side of the valve actuator, and
a second conduit section configured for connecting the outlet of the control valve to the non-pressure side of the valve actuator, wherein the pressure-relief valve forms part of the second conduit section.

3. The actuator controller according to claim 2, wherein the valve actuator comprises:
a first combined inlet and outlet for allowing gas to enter and escape the pressure side of the valve actuator, wherein the first conduit section is configured for being connected to the first combined inlet and outlet, and
a second combined inlet and outlet for allowing gas to enter and escape the non-pressure side of the valve actuator, wherein the second conduit section is configured for being connected to the second combined inlet and outlet.

4. The actuator controller according to claim 1, wherein the pressure-relief valve is a non-return valve configured to prevent air from the surrounding atmosphere from entering the conduit.

5. The actuator controller according to claim 1, wherein the pressure-relief valve is configured to reduce the pressure in the conduit to a pressure level at the pressure level of the surrounding atmosphere.

6. The actuator controller according to claim 1, wherein the pressure-relief valve comprises an aperture for allowing gas to be released from the conduit to the surrounding atmosphere and a flexible membrane covering and pressing against the aperture for preventing air from the surrounding atmosphere from entering the conduit.

7. The actuator controller according to claim 1, wherein the pressure-relief valve includes a hollow body possessing one end portion directly connected to the control valve, an other end portion in direct communication with the non-pressure side of the valve actuator, and an aperture positioned between the one end portion and the other end portion and passing through a wall of the hollow body.

8. An assembly comprising a valve actuator and an actuator controller for controlling the function of the valve actuator, wherein the valve actuator is pneumatically operated, configured for being operatively connected to a valve, and comprises a cylinder and a piston movable inside the cylinder, the valve actuator has a pressure side and a non-pressure side separated by the piston, the piston is biased to be in a first position and is configured to move to a second position at a pressure increase on the pressure side of the valve actuator, and wherein the actuator controller comprises:
a conduit connecting the pressure and non-pressure sides of the valve actuator for supplying the non-pressure side of the valve actuator with gas from the pressure side of the valve actuator, a control valve connected to the conduit between the pressure and non-pressure sides for controlling a release of gas from the pressure side of the valve actuator into the conduit, and a pressure-relief valve connected to the conduit to reduce the pressure in the conduit, the pressure-relief valve being positioned between the control valve and the non-pressure side of the valve actuator so that gas supplied from the pressure side of the valve actuator to the non-pressure side of the valve actuator during operation of the assembly flows from the pressure side of the valve actuator through the control valve and subsequently passes through the pressure-relief valve which directs the gas to the non-pressure side of the valve actuator.

9. The assembly according to claim 8, wherein the control valve comprises:

an inlet for being connected to a pressure source to receive a pressurized gas from the pressure source, a combined inlet and outlet, and an outlet, wherein the control valve is configured to be operable between: i) a first state in which the control valve permits flow of the pressurized gas from the pressure source to the pressure side of the valve actuator by allowing the pressurized gas to flow from the inlet to the combined inlet and outlet, and prevents the flow of the pressurized gas from the pressure side of the valve actuator to the non-pressure side of the valve actuator by blocking the flow of the pressurized gas from the combined inlet and outlet to the outlet; and ii) a second state in which the control valve permits the flow of the pressurized gas from the pressure side of the valve actuator to the non-pressure side of the valve actuator by allowing the pressurized gas to flow from the combined inlet and outlet to the outlet, and prevents the flow of the pressurized gas from the pressure source to the pressure side of the valve actuator by blocking the flow from the inlet to the combined inlet and outlet, and wherein the conduit comprises:

a first conduit section connecting the combined inlet and outlet of the control valve to the pressure side of the valve actuator, and a second conduit section connecting the outlet of the control valve to the non-pressure side of the valve actuator, wherein the pressure-relief valve forms part of the second conduit section.

10. The assembly according to claim 9, wherein the valve actuator comprises:

a first combined inlet and outlet for allowing gas to enter and escape the pressure side of the valve actuator, wherein the first combined inlet and outlet is connected to the first conduit section, and a second combined inlet and outlet for allowing gas to enter and escape the non-pressure side of the valve actuator, wherein the second combined inlet and outlet is connected to the second conduit section.

11. The assembly according to claim 8, wherein the pressure-relief valve is a non-return valve configured to prevent air from the surrounding atmosphere from entering the conduit.

12. The assembly according to claim 11, wherein the pressure-relief valve is configured to reduce the pressure in the conduit to a pressure level at the pressure level of the surrounding atmosphere.

13. The assembly according to claim 8, wherein the pressure-relief valve comprises an aperture for allowing gas to be released from the conduit to the surrounding atmosphere and a flexible membrane covering and pressing against the aperture for preventing air from the surrounding atmosphere from entering the conduit.

14. A valve system comprising a valve and an assembly according to claim 8 operatively connected to the valve for controlling the valve.

15. The assembly according to claim 8, wherein the pressure-relief valve includes a hollow body possessing one end portion directly connected to the control valve, an other end portion in direct communication with the non-pressure side of the valve actuator, and an aperture positioned between the one end portion and the other end portion and passing through a wall of the hollow body.

16. A method of retrofitting a pressure-relief valve in an assembly comprising a valve actuator and an actuator controller for controlling the function of the valve actuator, wherein the valve actuator is pneumatically operated, configured for being operatively connected to a valve, and comprises a cylinder and a piston movable inside the cylinder, wherein the valve actuator has a pressure side and a non-pressure side separated by the piston, the piston is biased to be in a first position and is configured to move to a second position at a pressure increase on the pressure side of the valve actuator, and wherein the actuator controller comprises: a control valve for controlling a release of gas from the pressure side of the valve actuator, wherein the control valve comprises an inlet for being connected to a pressure source to receive a pressurized gas from the pressure source, a combined inlet and outlet, and an outlet, wherein the control valve has a first state in which the control valve leads pressurized gas from the inlet to the combined inlet and outlet and a second state in which the control valve leads pressurized gas from the combined inlet and outlet to the outlet, the assembly further comprises a first conduit section connecting the combined inlet and outlet of the control valve to the pressure side of the actuator, and wherein the method comprises:

providing a second conduit section and the pressure-relief valve forming part of the second conduit section, and establishing a connection between the outlet of the control valve and the non-pressure side of the valve actuator with the second conduit section to position the pressure-relief valve between the control valve and the non-pressure side of the valve actuator so that during operation of the assembly the gas supplied from the pressure side of the valve actuator to the non-pressure side of the valve actuator flows from the pressure side of the valve actuator to the control valve and is then directed by the control valve to pass through the pressure-relief valve which directs the gas to the non-pressure side of the valve actuator, wherein the first conduit section, the control valve, the second conduit section, and the pressure-relief valve form parts of a conduit connecting the pressure and non-pressure sides of the valve actuator for supplying the non-pressure side of the valve actuator with gas from the pressure side of the valve actuator, wherein the pressure-relief valve is configured for reducing the pressure in the second conduit section.

17. The method according to claim 16, wherein the valve actuator comprises a first combined inlet and outlet for allowing gas to enter and escape the pressure side of the valve actuator and a second combined inlet and outlet for allowing gas to enter and escape the non-pressure side of the valve actuator, wherein the first combined inlet and outlet is connected to the first conduit section, and wherein the method comprises:

establishing a connection between the outlet of the control valve and the second combined inlet and outlet with the second conduit section.

18. The method according to claim 16, wherein the pressure-relief valve includes a hollow body possessing one end portion directly connected to the control valve, an other end portion in direct communication with the non-pressure side of the valve actuator, and an aperture positioned between the one end portion and the other end portion and passing through a wall of the hollow body.

* * * * *